US009007546B2

(12) United States Patent
Seo et al.

(10) Patent No.: US 9,007,546 B2
(45) Date of Patent: Apr. 14, 2015

(54) LIGHT GUIDE PLATE AND LIQUID CRYSTAL DISPLAY APPARATUS USING THE SAME

(71) Applicant: LG Display Co., Ltd., Seoul (KR)

(72) Inventors: Jeongho Seo, Namyul-ri (KR); Dongnyuck Park, Paju-si (KR); Kang Heo, Goyang-si (KR); Hansol Park, Samcheok-si (KR)

(73) Assignee: LG Display Co., Ltd., Seoul (KR)

( * ) Notice: Subject to any disclaimer, the term of this patent is extended or adjusted under 35 U.S.C. 154(b) by 173 days.

(21) Appl. No.: 13/705,941

(22) Filed: Dec. 5, 2012

(65) Prior Publication Data

US 2013/0300979 A1 Nov. 14, 2013

(30) Foreign Application Priority Data

May 10, 2012 (KR) .................. 10-2012-0049634

(51) Int. Cl.
*G02F 1/1335* (2006.01)
*F21V 8/00* (2006.01)

(52) U.S. Cl.
CPC ............ *G02B 6/0016* (2013.01); *G02B 6/0015* (2013.01); *G02F 1/133615* (2013.01); *G02B 6/0068* (2013.01)

(58) Field of Classification Search
CPC .. G02B 6/0013; G02B 6/0015; G02B 6/0016; G02B 6/002; G02B 6/0021
USPC ............... 349/65, 58; 362/608, 621, 632–634
See application file for complete search history.

(56) References Cited

U.S. PATENT DOCUMENTS

| 2006/0087867 A1* | 4/2006 | Kim ............................... 362/619 |
| 2007/0081360 A1 | 4/2007 | Bailey et al. |
| 2007/0109464 A1 | 5/2007 | Jung et al. |
| 2007/0126950 A1 | 6/2007 | Kurihara et al. |
| 2007/0217226 A1* | 9/2007 | Zhu et al. ...................... 362/615 |
| 2007/0258165 A1 | 11/2007 | Ahn et al. |
| 2007/0258265 A1* | 11/2007 | Lee et al. ...................... 362/612 |
| 2009/0268484 A1* | 10/2009 | Kim et al. ..................... 362/608 |
| 2013/0088892 A1* | 4/2013 | Tanaka .......................... 362/613 |
| 2013/0250614 A1* | 9/2013 | Thompson et al. ........... 362/608 |

FOREIGN PATENT DOCUMENTS

JP   2007220447 A   8/2007
WO  WO2012008220 A1 * 1/2012

OTHER PUBLICATIONS

Office Action issued in corresponding United Kingdom Patent Application No. GB1220683.5, mailed Mar. 6, 2013.
Office Action issued in German Patent Application No. 102012112819.7, mailed Jun. 13, 2014, 11 pages.

* cited by examiner

*Primary Examiner* — Michael Caley
(74) *Attorney, Agent, or Firm* — Brinks Gilson & Lione

(57) ABSTRACT

Light can be uniformly distributed in the bezel area by diffusing the light in the bezel area blocked by an upper case, or by providing an optical pattern for light concentration. Accordingly, the brightness of light is similar for all positions at the boundary between the bezel area and the display area, thereby solving the hot spot problem caused by a brightness difference depending on position.

17 Claims, 12 Drawing Sheets

LIGHT GUIDE PLATE AND LIQUID CRYSTAL DISPLAY APPARATUS USING THE SAME

This application claims the benefit of Korea Patent Application No. 10-2012-0049634 filed on May 10, 2012, which is incorporated herein by reference for all purposes as if fully set forth herein.

BACKGROUND

1. Field of the Disclosure

The present disclosure relates to a light guide plate, which improves a hot spot phenomenon, and a liquid crystal display apparatus using the same.

2. Discussion of the Related Art

Liquid crystal display apparatus, using a liquid crystal panel as a display, are employed for handheld computers such as a laptop computer, office automation equipment, audio/video devices, indoor/outdoor advertisement display devices, and the like. A transmission type liquid crystal display apparatus, which is the most common liquid crystal display apparatus, displays an image by modulating a light incident from a backlight unit by controlling an electric field applied to a liquid crystal layer.

The backlight unit is divided into a direct type backlight unit and an edge type backlight unit. The edge type backlight unit has a structure that light sources are disposed to face a side of a light guide plate and a plurality of optical sheets are disposed between a liquid crystal panel and the light guide plate. In the edge type backlight unit, the light sources irradiate light to one side of the light guide plate and the light guide plate converts a linear light source or point light source into a surface light source. The direct type backlight unit has a structure in which a plurality of light sources are disposed under the liquid crystal display panel and irradiate light diffused through a diffusion plate to the liquid crystal panel.

Of the two, the edge type backlight unit has the problem of the hot spot phenomenon because light is supplied to a side of the light guide plate.

FIG. 1 is a view for explaining the hot spot problem, which is a top plan view selectively showing light emitting diodes LED1 and LED2 used as light sources and a light guide plate 10.

As illustrated in FIG. 1, the first and second light emitting diodes LED1 and LED2 are disposed at an one side so as to face an edge of the light guide plate 10. As is generally known, the light emitting diodes are directional elements, and a light thus enters the light guide plate 10 at a predetermined directivity angle ($\alpha$). As such, there exists a portion (a slashed portion in the drawing, hereinafter, "shaded area GA") where light coming from the first light emitting diode LED1 and light coming from the second light emitting diode LED2 are not mixed up together. Accordingly, the shaded area GA looks dark, and a portion where a light comes from the first light emitting diode LED1 and the second light emitting diode LED2 (hereinafter, "emission area WA") looks bright, which generates a difference in brightness depending on position and leads to the hot spot problem. FIG. 2 shows an actual appearance of a liquid crystal panel where the hot spot phenomenon occurs. In FIG. 2, it can be seen that an incident plane of the light guide plate 10 facing the light emitting diodes has a wave-like pattern due to the hot spot (inside the box in FIG. 2). If light appears to be wave-like, the luminance of the liquid crystal panel becomes non-uniform due to the wave-like pattern of the light guide plate, because the light guide plate is a component that changes a point light source into a surface light source and supplies light to the liquid crystal panel disposed above it, thus failing to properly display an image in a desired shape.

A simple way of overcoming this hot spot problem is to increase the number of light emitting diodes. That is, the hot spot problem can be overcome by arranging light emitting diodes densely enough to prevent the formation of the shaded area GA illustrated in FIG. 1. However, such an increase in the number of light emitting diodes requires higher power consumption, which is not desirable.

Another way is to increase bezel size so that a hot spot portion is blocked and not visible. The liquid crystal panel and the backlight unit are normally packaged in a case: a back cover and a front cover are coupled together to package the liquid crystal panel and the backlight unit interposed therebetween. Being packaged, the edges of the liquid crystal panel are blocked by the front cover. The portion at which the liquid crystal panel is blocked by the front cover is referred to as a bezel. The bezel covers the liquid crystal panel on the front side, thus reducing the size of the display area where the liquid crystal panel displays an image.

Recently released liquid crystal display apparatuses are reduced in bezel size and thus have an enlarged display area, which appeals to consumers in terms of design. As such, the method of increasing bezel size for the purpose of solving the hot spot problem is not advantageous because of a reduction in display area, and is undesirable in terms of design.

SUMMARY

A light guide plate is provided, which allows light emitted from a light source to enter through an incident plane. The light guide plate may include: a pattern unit spaced a predetermined distance away from the incident plane and at least partially formed in a first direction in parallel with the incident plane, wherein the light guide plate comprises a bezel area blocked by a bezel and a display area outside the bezel area, wherein the pattern unit is configured to diffuse light incident through the incident plane in the first direction in the bezel area, and wherein the bezel area comprises an emission area, which falls within the range of the directivity angle of the light source, and a shaded area, which is out of the range of the directivity angle of the light source, wherein a part of the pattern unit is formed in the shaded area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EXEMPLARY EMBODIMENTS

Figure 3:
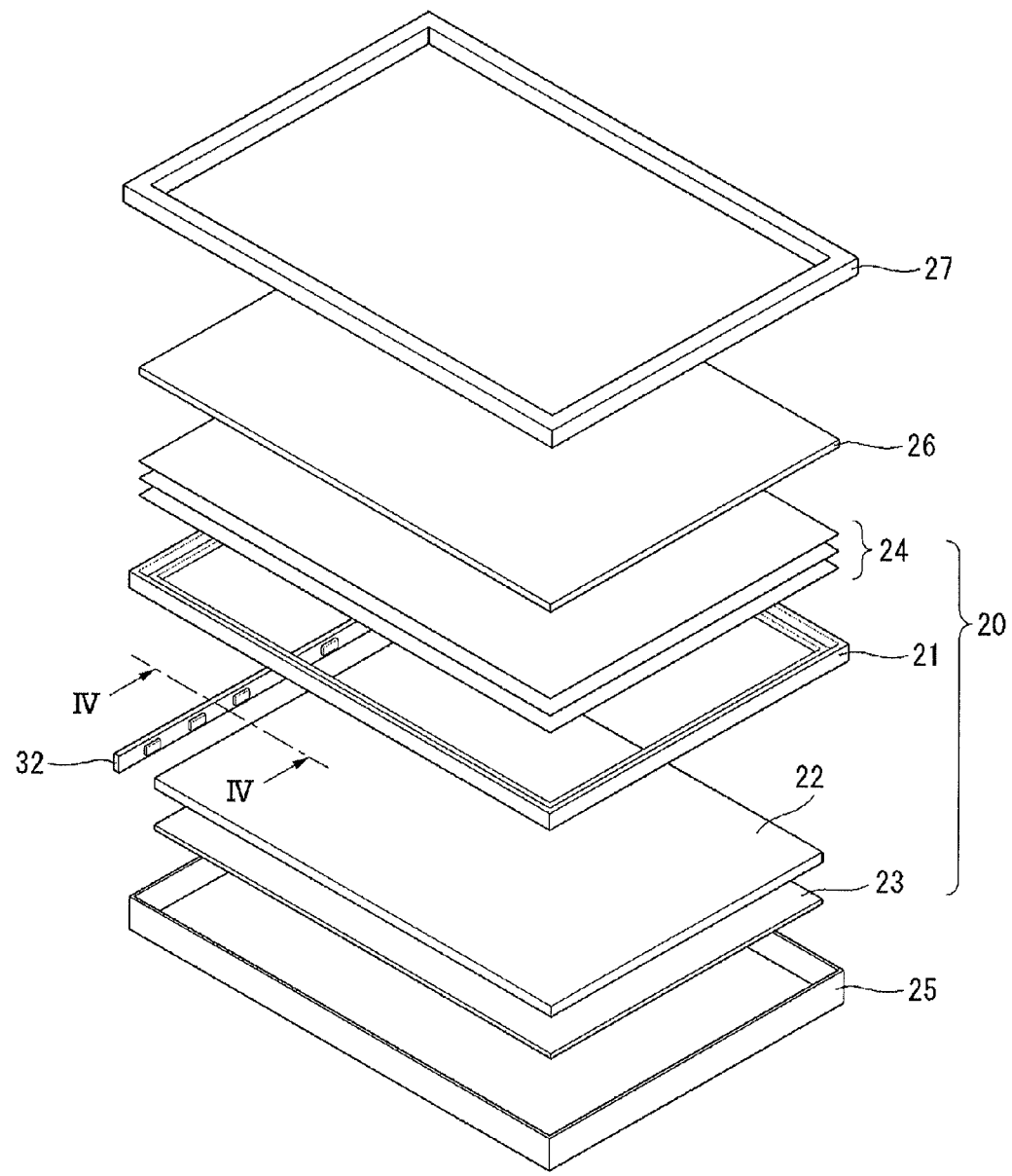
FIG. 3 is a schematic exploded perspective view of a liquid crystal display apparatus according to an exemplary embodiment of the present invention.
Figure 4:
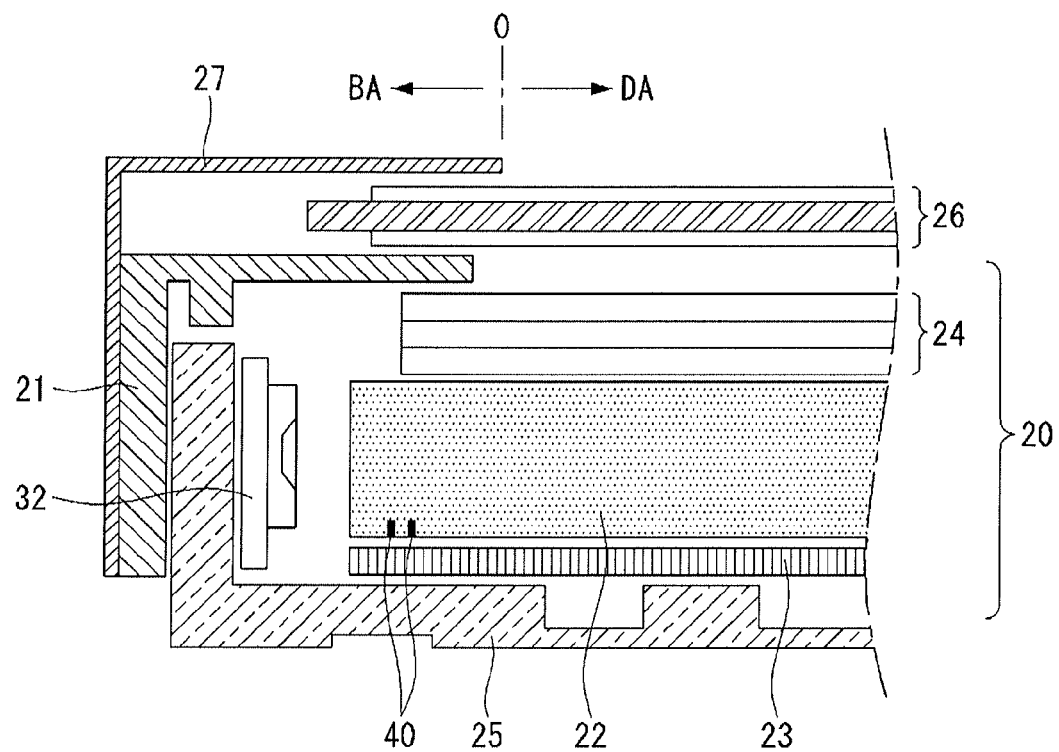
FIG. 4 is a cross-sectional view taken along line IV-IV of FIG. 3.

FIG. 3 is a schematic exploded perspective view of a liquid crystal display apparatus according to an exemplary embodiment of the present invention. FIG. 4 is a cross-sectional view taken along line IV-IV of FIG. 3. In FIGS. 3 and 4, the liquid crystal display apparatus according to an exemplary embodiment of the present invention comprises a liquid crystal panel 26 and a backlight unit 20 supplying light to the liquid crystal panel 26. The liquid crystal panel 26 and the backlight unit 20 are packaged in a module using a lower case 25 and an upper case 27.

The liquid crystal display 26 comprises a liquid crystal layer formed between an upper glass substrate and a lower glass substrate, and is implemented in a Fringe Field Switching (FFS) mode, a Vertical Alignment (VA) mode, a Twisted Nematic (TN) mode, an In-Plane-Switching (IPS) mode, etc.

The backlight unit 20 comprises a light source 32, a reflection plate 23, a light guide plate 22, and a plurality of optical sheets 24, and converts light coming from the light source 32 into uniform light of a surface light source through the light guide plate 22 and the optical sheets 24 and supplies the light to the liquid crystal panel 26.

The light source 32 comprises a substrate and light emitting diodes mounted on the substrate. The light source 32 is disposed on a wall surface of the lower case 25 so that the light emitting diodes face a side of the light guide plate 22. The light coming from the light source 32 enters the light guide plate 22 through the side of the light guide plate 22 and is then converted into a surface light and supplied upwards.

The light guide plate 22 is formed of a plate material made of transparent plastic, for example, polymethyl metacrylate (PMMA), and plays the role of converting light of a point light source or linear light into light of a surface light. The light guide plate 22 comprises a pattern unit 40 which distributes light incident on the bottom surface to be close to a side plane (hereinafter, incident plane) facing the light source 32 and supplies the light uniformly throughout the light guide plate 22. The pattern unit 40 is formed at a position corresponding to a bezel area BA, which will be described in detail with reference to the drawings.

The optical sheets 24 are provided on the light guide plate 22. The optical sheets 24 comprise one or more prism sheets and one or more diffusion sheets, and diffuse light incident from the light guide plate 22 and refract the traveling path of light beams at an angle substantially perpendicular to the light incident plane of the liquid crystal panel 26.

The liquid crystal panel 26 and the backlight unit 20 are interposed between the lower case 25 and the upper case 27 and packaged in a module by them.

The lower case 25 has a thin box-like shape so as to contain the backlight unit 20. The backlight unit 20 and the liquid crystal panel 26 are sequentially stacked and contained in a space of the lower case 25.

In an example, the upper case 27 has an L-shaped cross section so as to be coupled to the lower case 25 while enclosing the side walls of the lower case 25. The upper case 27 is used to package the backlight unit 20 with the lower case 25, and prevents the backlight unit 20 from being damaged by external impact. As the upper case 27 is coupled to the lower case 25, the edges of the liquid crystal panel 26 are blocked by the upper case 27. In this specification, a portion of the liquid crystal panel 26, which is blocked by the upper case 27 and does not display an image, is referred to as a bezel area BA, and a portion thereof, which is not blocked by the upper case 27 and displays an image, is referred to as a display area DA.

Figure 5:
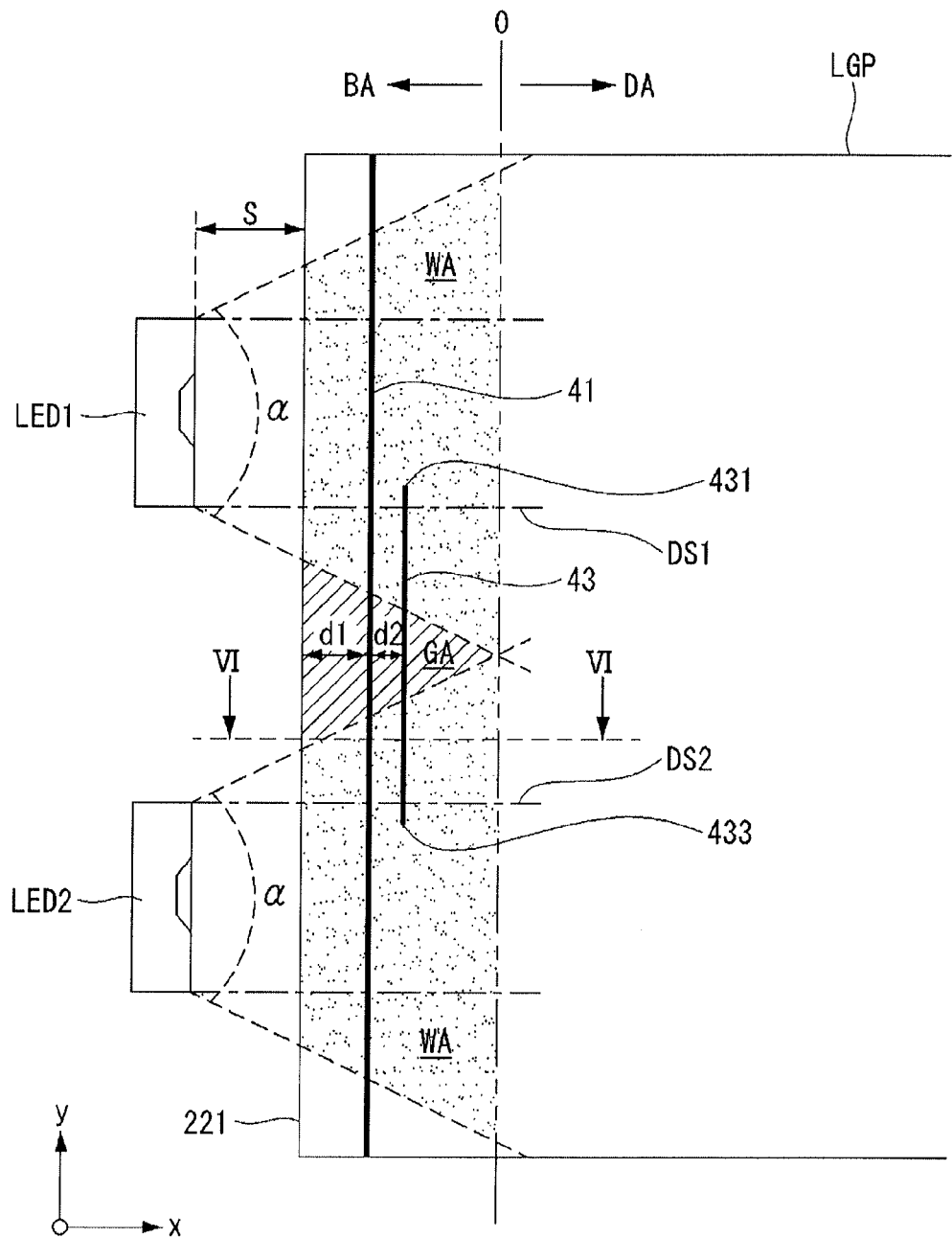
FIG. 5 is a top plan view for explaining a light guide plate according to an exemplary embodiment of the present invention.
Figure 6:
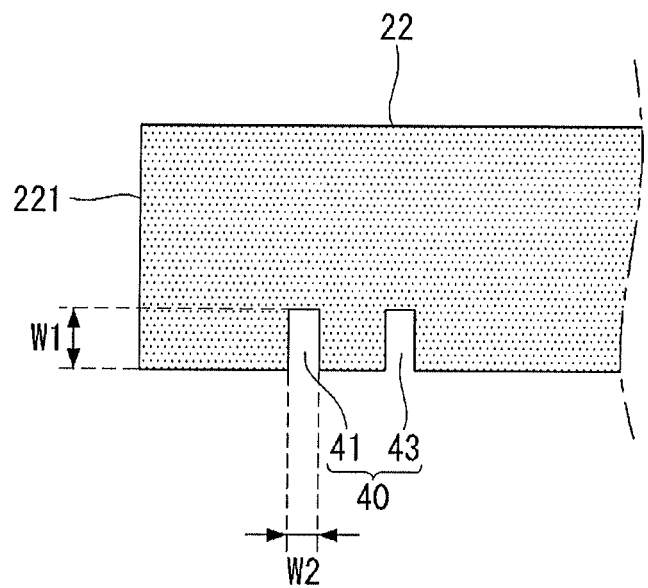
FIG. 6 is a cross-sectional view taken along line VI-VI of FIG. 5.

FIG. 5 is a view for explaining the light guide plate 22 according to an exemplary embodiment of the present invention, which is a top plan view selectively depicting the light emitting diodes and the light guide plate 22. FIG. 6 is a cross-sectional view taken along line VI-VI of FIG. 5. For convenience of description, the following description will be made on the case where the first and second light emitting diodes LED1 and LED2 are disposed to face the incident plane 221 of the light guide plate 22.

In FIGS. 5 and 6, as described above, the incident plane 221 side of the light guide plate 22 constitutes the bezel area BA with respect to a boundary line 0, and the opposite side thereof constitutes the display area DA. The bezel area BA is the portion blocked by the upper case 27, and the display area DA is the portion in which the liquid crystal panel is exposed as it is, which actually displays an image by the light supplied through the light guide plate 22.

The first light emitting diode LED1 is spaced a predetermined distance (s) away from the incident plane 221 while facing the incident plane 221 of the light guide plate 22. As the distance (s) between the first light emitting diode LED1 and the light guide plate 22 becomes shorter, the amount of light supplied to the light guide plate 22 becomes larger and thus the intensity of a hot spot increases. On the contrary, as the distance (s) becomes longer, the amount of light supplied to the light guide plate 22 becomes smaller and thus the intensity of a hot spot decreases, but there still remains the problem of low luminance because of a reduction in the amount of incident light. Aside from this, various factors such as the size and directivity angle of the light emitting diodes can be considered when determining the distance (s) between the first light emitting diode LED1 and the light guide plate 22. The second light emitting diode LED2 is likewise adjacent to the light guide plate 22, spaced a predetermined distance (s) from it, and disposed adjacent to the first light emitting diode LED1.

The first light emitting diode LED1 and the second light emitting diode LED2 make a predetermined directivity angle (α) with each other, and supply light to the light guide plate 22. Accordingly, while a large amount of light is supplied to the emission area WA within the range of the directivity angle (α) of the first and second light emitting diodes LED1 and LED2, a relatively small amount of light is supplied to the shaded area GA out of the range of the directivity angle (α).

A pattern unit 40 is formed at a position corresponding to, in other words within, the bezel area BA of the light guide plate 22. The pattern unit 40 mixes the light incident on the light guide plate 22 through the incident plane 221 uniformly throughout the light guide plate 22 in the bezel area BA, regardless of positions, and diffuses it to the display area DA. Accordingly, a hot spot having a pattern of waves seen at the boundary between the display area DA and the bezel area BA can be reduced. In an exemplary embodiment, the pattern unit 40 is formed of fine grooves by laser processing, or formed by printing ink on the bottom surface of the light guide plate 22. Unless otherwise explained, the following description will be made on the case where the pattern unit 40 is formed by laser processing.

In a first exemplary embodiment of FIG. 5, the pattern unit 40 comprises a diffusion pattern 41 and a compensation pattern 43. Among them, the diffusion pattern 41 is spaced a first distance (d1) away from the incident plane 221 of the light guide plate 22, and is longitudinally formed in one direction (x-axis direction in the drawing) in parallel with the incident plane 221. The diffusion pattern 41 is longer than the distance between the first light emitting diode LED1 and the second light emitting diode LED2, preferably in parallel with the entire incident plane 221. The light emitted from the first and second light emitting diodes LED1 and LED2 enter the light guide plate in accordance with the directivity angle (α). Therefore, the light entering the light guide plate is only supplied to the emission area WA which falls within the scope of the directivity angle, but is diffused sideways (in the y-axis direction in the drawing) along the diffusion pattern 41 as the light is diffusely reflected by the diffusion pattern 41. As a result, the light emitted from the first and second light emitting diodes is transferred as far as to the shaded area GA as the light is diffusely reflected by the diffusion pattern 41, and therefore the light is uniformly distributed all over the bezel area BA, thereby reducing the hot spot phenomenon caused by a brightness difference.

The diffusion pattern 41 is formed at the first distance (d1) away from the incident plane 221, preferably greater than about 0.8 mm and less than about 1.2 mm. If the first distance (d1) is less than about 0.8 mm, the light diffused along the diffusion pattern 41 is so bright that it looks like a bright line. On the contrary, if the first distance (d1) is greater than about 1.2 mm, the brightness of the light is so low that light diffusion by the diffusion pattern 41 does not properly occur, thus causing a hot spot phenomenon.

In a light incident direction (x-axis direction in the drawing), the compensation pattern 43 is further formed to be adjacent to the diffusion pattern 41. The compensation pattern 43 is shorter than the diffusion pattern 41, and preferably has a length enough to cross the shaded area GA between the first light emitting diode LED1 and the second light emitting diode LED2.

The compensation pattern 43 extends in one direction (y-axis direction in the drawing) in parallel with the diffusion pattern 41, and is spaced a second distance (d2) away from the diffusion pattern 41. The second distance (d2) is greater than about 0.3 mm and less than about 0.7 mm, and is therefore shorter than the first distance (d1). If the second distance (d2) is greater than about 0.7 mm, the light diffused by the diffusion pattern 41 is not properly transferred toward the compensation pattern 43 and thus makes it difficult to concentrate light, and therefore the second distance (d2) is less than about 0.7 mm. Moreover, the compensation pattern 43 is spaced away from the diffusion pattern 41 by a minimum of about 0.3 mm by taking the operation margin of the laser process for forming the compensation pattern 43 into consideration.

One end 431 of the compensation pattern 43 is disposed inward than an extension line DS1 formed by extending the inner ends of the first light emitting diode LED, and the other end 433 thereof is disposed inward than an extension line DS2 formed by extending the inner ends of the second light emitting diode LED2. Accordingly, the compensation pattern 43 is selectively provided in the shaded area GA between the first light emitting diode LED1 and the second light emitting diode LED2, and the ends 431 and 433 are provided to partially face the first light emitting diode LED1 and the second light emitting diode LED2, respectively.

Therefore, the light emitted from the first light emitting diode LED1 is supplied to one end 431 of the compensation pattern 43, and the light emitted from the second light emitting diode LED2 is supplied to the other end 433 and diffused along the compensation pattern 43 and supplied to the shaded area GA. Due to this, a relatively small amount of light is supplied, and this contributes to a reduction of brightness difference between the shaded area GA and the emission area WA which leads to a hot spot, thereby improving the hot spot phenomenon.

FIG. 6 shows a cross-section of the above-described pattern unit 40. As illustrated in FIG. 6, the diffusion pattern 41 and the compensation pattern 43 are formed by grooves on the bottom of the light guide plate 22. The depth (w1) of the grooves 41 and 43 forming the pattern unit 40 is greater than 45 um and less than 55 um. If the depth (w1) is less than 45 um, diffused reflection caused by the grooves does not properly occur because of the small size of the grooves. On the contrary, if the depth (w1) is greater than 55 mm, the grooves are so large that this obstructs diffused reflection.

If the width (w2) of the grooves is greater than 8 um and less than 12 um. If the width (w2) of the grooves is less than 8 um, the width of the pattern is too small so that light is not properly transferred along the pattern. Likewise, if the width (w2) is greater than 12 um, the width of the pattern is too large so that light is not transferred along the pattern.

Figure 7:
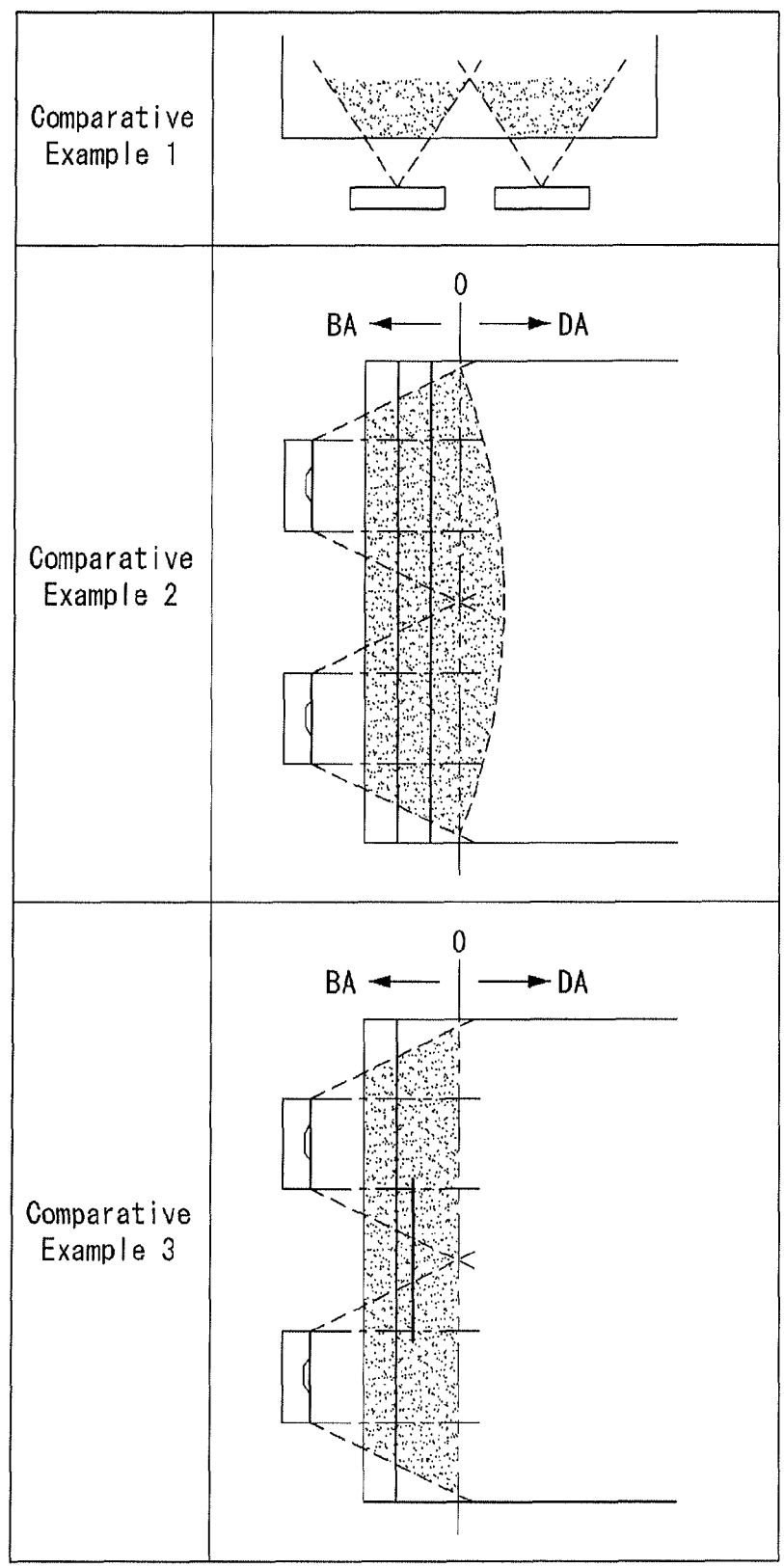
FIG. 7 is a light profile showing the light distribution with a diffusion pattern and a compensation pattern.

FIG. 7 is a light profile showing the characteristics of light diffusion changing with the above-described diffusion pattern 41 and compensation pattern 43. The test was carried out using a 47-inch model under the same conditions as set forth for Comparative Examples 1, 2, and 3. As illustrated in FIG. 7, Comparative Example 1 shows that a pattern such as the diffusion pattern 41 or compensation pattern 43 is not formed in the bezel area BA in the prior art. In case that it is not provided in the bezel area BA, a hot spot was visible at the boundary between the bezel area BA and the display area DA due to the directional characteristics of the light emitting diodes.

Comparative Example 2 shows that the above-described diffusion pattern 41 is formed in two rows. The distance between the diffusion patterns is 1 mm, and the distance between the incident plane and the first diffusion pattern 41 is 1 mm, too. In this case, although the hot spot phenomenon was reduced because light diffusion caused by the diffusion patterns 41 appeared significantly along the patterns, a difference in the brightness of light was generated at the boundary between the bezel area BA and the display area DA because of too high brightness, and therefore a bright line appeared.

Comparative Example 3 shows that the diffusion pattern 41 and the compensation pattern 43 are formed, as in the above-described first exemplary embodiment. The distance between the diffusion pattern 41 and the incident plane 221 is 1 mm, and the distance between the diffusion pattern 41 and the compensation pattern 43 is 0.5 mm. In Comparative Example 3, the hot spot as shown in the above-described Comparative Example 1 or the bright line as shown in Comparative Example 2 was not shown.

Figure 8:
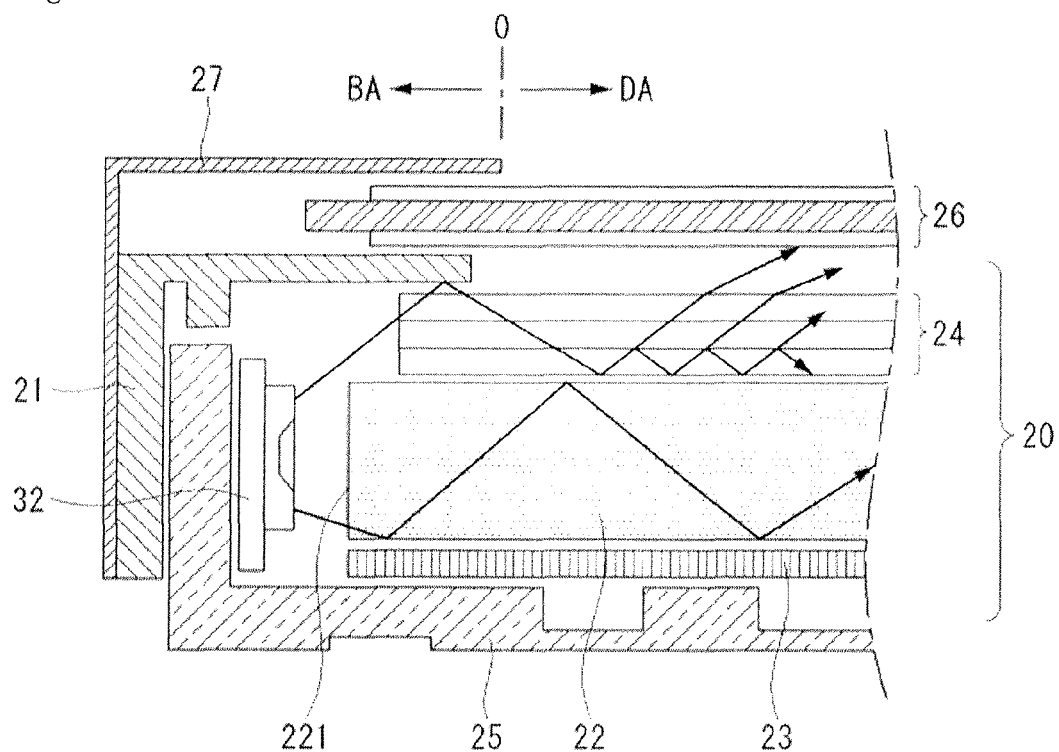
FIG. 8 is a view for explaining the process of light propagation in the light guide plate when there is no pattern unit.
Figure 9:
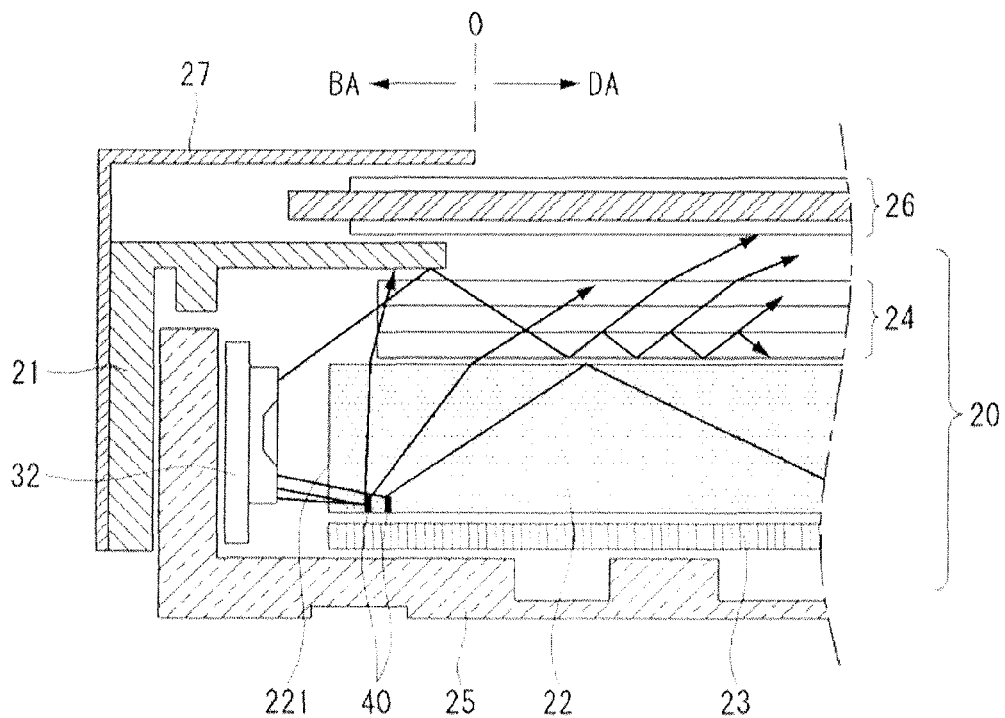
FIG. 9 is a view for explaining the process of light propagation in the light guide when there is a pattern unit.

FIGS. 8 and 9 are views for explaining light diffusion by comparing a light guide plate with a pattern unit and a light guide plate with no pattern unit. FIG. 8 is a cross-sectional view of the prior art liquid crystal display apparatus with no pattern unit, and FIG. 9 is a cross-sectional view of the above-described liquid crystal display apparatus with a pattern unit according to the first exemplary embodiment of the present invention.

In FIG. 8, part of the light emitted from the light source 32 is supplied into the light guide plate 22 through the incident plane 221 of the light guide plate 22. The light is totally reflected inside the light guide plate 22 and supplied throughout the light guide plate 22. Part of the light does not enter the light guide plate 22 but is transferred towards the optical sheets 24 and supplied to the liquid crystal panel 26 through the optical sheets 24. However, it can be seen that little light is supplied at the boundary between the bezel area BA and the display area DA because of the traveling path of light. When light is not supplied in some parts, this generates a difference in the brightness of light depending on position, thereby causing a hot spot.

In comparison, as shown in FIG. 9, the pattern unit 40 of this exemplary embodiment diffusely reflects light, and therefore part of the diffusely reflected light proceeds even to the boundary between the bezel area BA and the display area DA. Thus the hot spot problem shown in FIG. 9 can be reduced.

Figure 1:
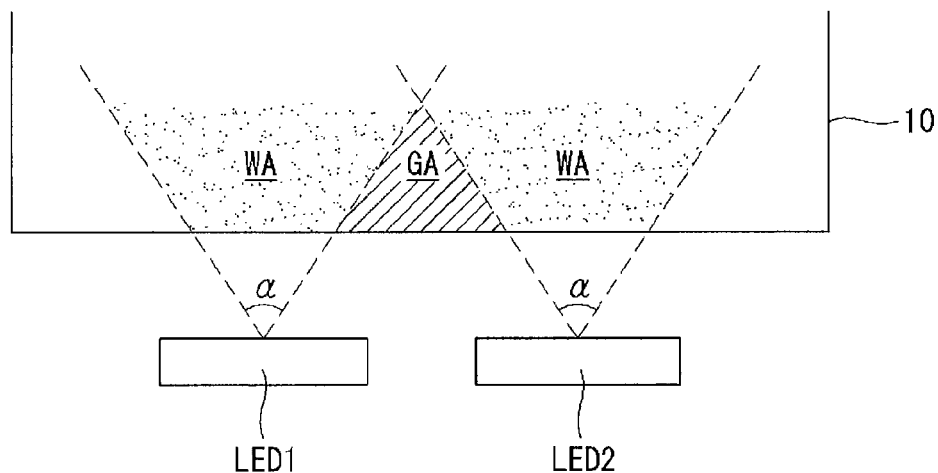
FIG. 1 is a view for conceptually explaining the hot spot problem.
Figure 2:
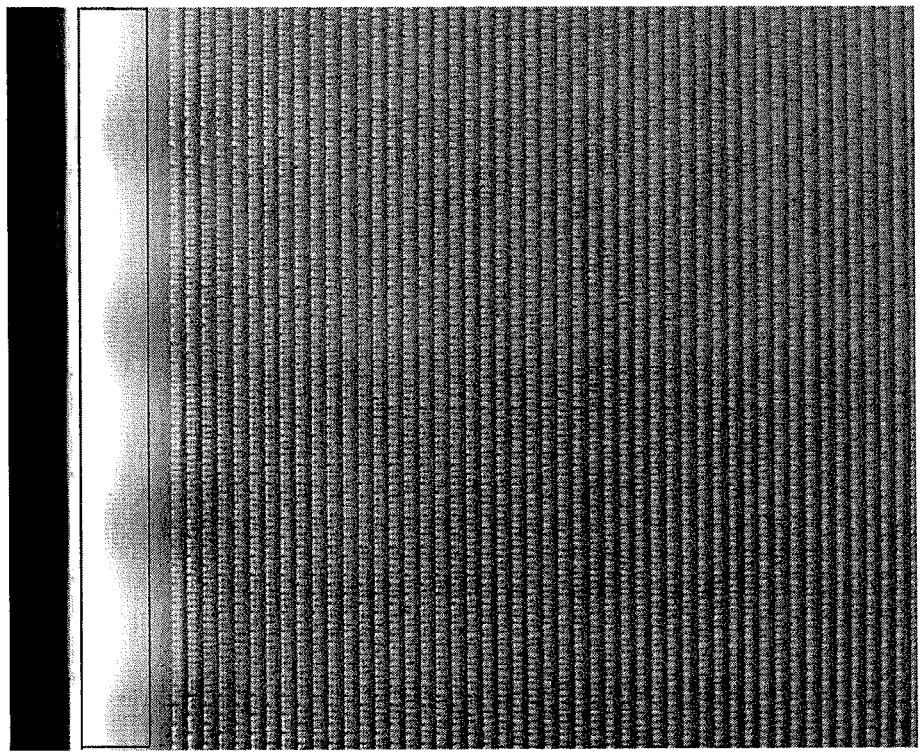
FIG. 2 shows an actual appearance of a liquid crystal panel where the hot spot phenomenon occurs.
Figure 10:
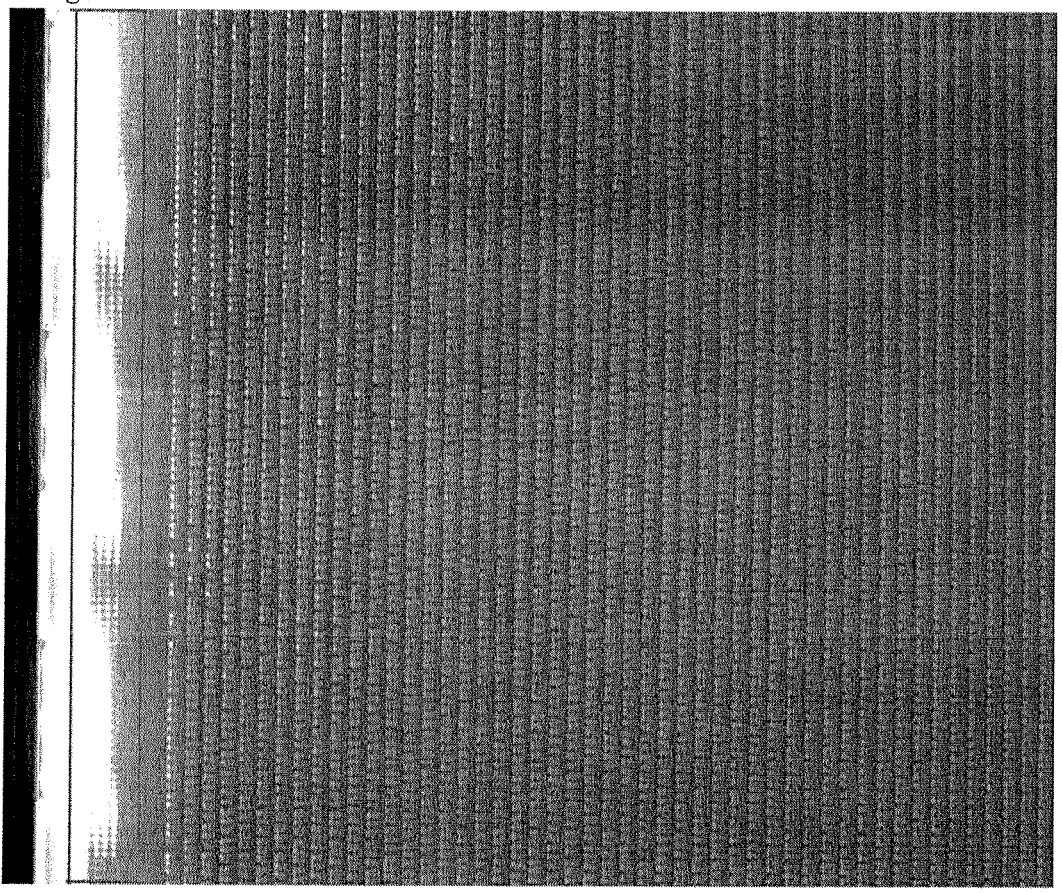
FIG. 10 is a view showing an actual appearance of the light guide plate according to the first exemplary embodiment.

The above description can be confirmed through an actual appearance of the light guide plate illustrated in FIG. 10. FIG. 10 is a photograph of an actual appearance of the light guide plate according to the first exemplary embodiment, from which it can be seen that the profile of light in the portion (the box in the drawing) between the bezel area and the display area is significantly changed compared to FIG. 2. While light has a wave-like pattern in FIG. 2, wave-like pattern was not observed in FIG. 10.

Figure 11:
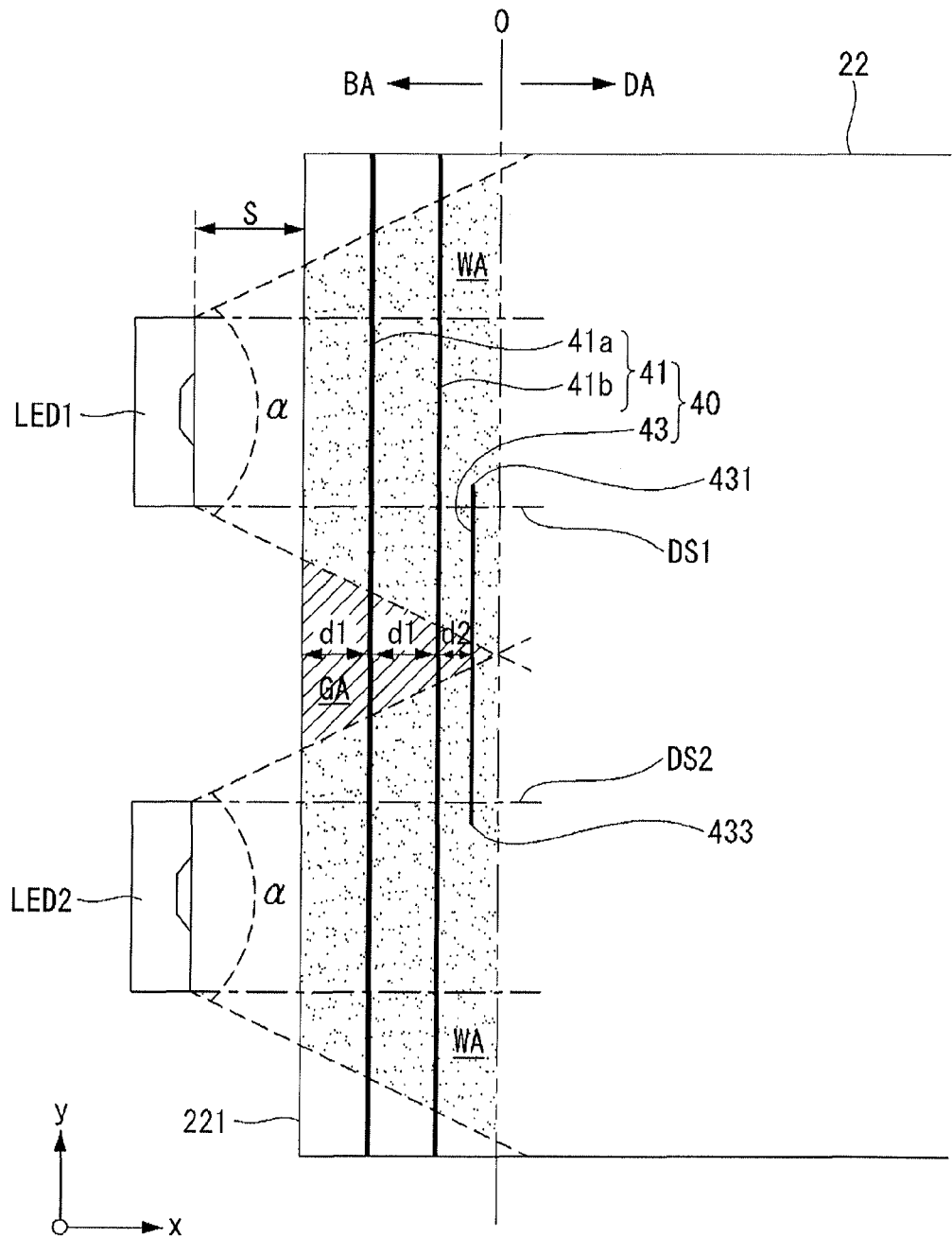
FIG. 11 is a top plan view showing the appearance of a light guide plate according to a second exemplary embodiment of the present invention.

FIG. 11 shows the planar arrangement of the light guide plate 22 and the light emitting diodes according to a second exemplary embodiment of the present invention. The number of diffusion patterns 41 is somewhat different from that of the above-described first exemplary embodiment. Thus, only a description of this difference will be made in detail, and other descriptions will be made in brief.

In the second exemplary embodiment, the pattern unit 40 comprises first and second diffusion patterns 41a and 41b and a compensation pattern 43.

Among them, the first diffusion pattern 41a is spaced a first distance (d1) away from the incident plane 221 of the light guide plate 22, and is longitudinally formed in one direction (y-axis direction in the drawing) in parallel with the incident plane 221. The second diffusion pattern 41b is adjacent in parallel to the first diffusion pattern 41a, and spaced the first distance (d1) away from the first diffusion pattern 41a.

Like the first exemplary embodiment, the diffusion pattern 41 of the second exemplary embodiment is longer than the distance between the first light emitting diode LED1 and the second light emitting diode LED2, preferably, in parallel with the entire incident plane 221.

In the second exemplary embodiment, the diffusion pattern 41 causes the light emitted from the first and second light emitting diodes to be transferred as far as to the shaded area GA, and therefore the light is uniformly distributed all over the bezel area BA, thereby reducing the hot spot phenomenon caused by a brightness difference.

The first diffusion pattern 41a is spaced the first distance (d1) away from the incident plane 221, and the first diffusion pattern 41a is preferably spaced the first distance (d1) away from the second diffusion pattern 41b. Like the above-described first exemplary embodiment, the first distance (d1) is greater than about 0.8 mm and less than about 1.2 mm.

In a light incident direction (x-axis direction in the drawing), the first diffusion pattern 41a and the second diffusion pattern 41b are sequentially provided, and the compensation pattern 43 is provided adjacent to the second diffusion pattern 41b. The compensation pattern 43 is shorter than the diffusion pattern 41, and preferably has a length enough to cross the shaded area GA between the first light emitting diode LED1 and the second light emitting diode LED2.

The compensation pattern 43 extends in one direction (y-axis direction in the drawing) in parallel with the diffusion pattern 41, and is spaced a second distance (d2) away from the diffusion pattern 41. The second distance (d2) is greater than about 0.3 mm and less than about 0.7 mm. One end 431 of the compensation pattern 43 is disposed inward than an extension line DS1 formed by extending the inner ends of the first light emitting diode LED, and the other end 433 thereof is disposed inward than an extension line DS2 formed by extending the inner ends of the second light emitting diode LED2.

In the thus-configured light guide plate of the second exemplary embodiment, the diffusion pattern comprises the first and second diffusion patterns 41a and 41b, and therefore the amount of light supplied to the display area DA of the light guide plate 22 is relatively large compared to the first exemplary embodiment. For this reason, it is preferred that the light guide plate of the second exemplary embodiment is applied to a liquid crystal display apparatus with a fewer light sources than that of the first exemplary embodiment.

Figure 12:
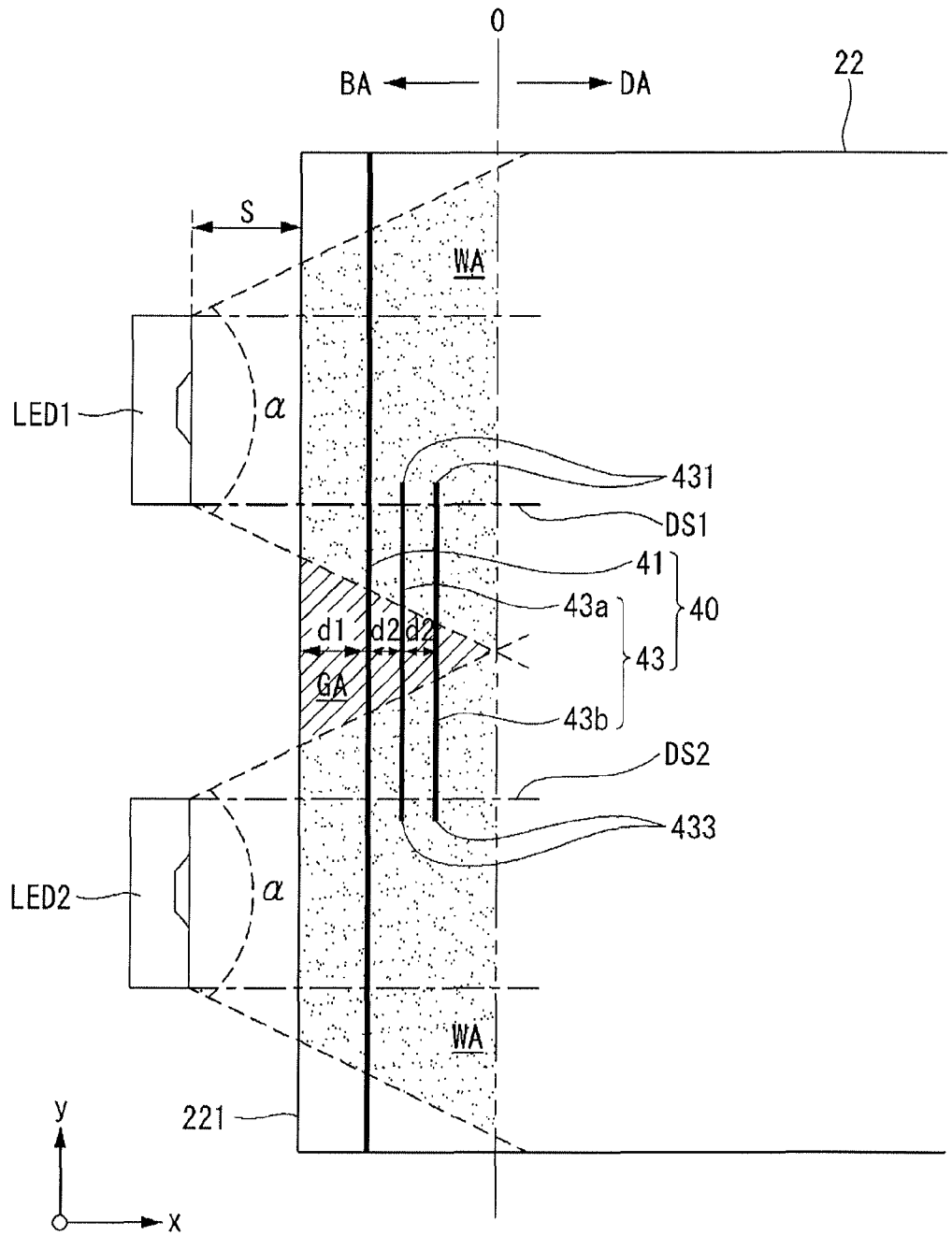
FIG. 12 is a top plan view showing the appearance of a light guide plate according to a third exemplary embodiment of the present invention.

FIG. 12 shows the planar arrangement of the light guide plate 22 and the light emitting diodes according to a third exemplary embodiment of the present invention. The third exemplary embodiment is identical to the above-described first exemplary embodiment, except for the number of compensation patterns 43. Thus, only a description of the compensation pattern 43 is made, and descriptions of the other components are made in brief.

In the third exemplary embodiment, the pattern unit 40 comprises a diffusion pattern 41 and first and second compensation patterns 43a and 43b.

The diffusion pattern 41 is spaced a first distance (d1) away from the incident plane 221 of the light guide plate 22, and is longitudinally formed in the y-axis direction in the drawing in parallel with the incident plane 221. The diffusion pattern 41 diffuses the light entering the light guide plate 22 through the incident plane 221 in the first and light emitting diodes LED1 and LED2 along the pattern in the y-axis direction in the drawing and uniformly distributes it in the bezel area BA. Like the above-described first exemplary embodiment, the first distance (d1) is greater than about 0.8 mm and less than about 1.2 mm.

In a direction (x-axis direction in the drawing) of light entering the light guide plate 22, the compensation pattern 43 is further formed to be adjacent to the diffusion pattern 41. The compensation pattern 43 comprises a first compensation pattern 43a disposed immediately adjacent to the diffusion pattern 41 and a second compensation pattern 43b adjacent to the first compensation pattern 43a.

First, the first compensation pattern 43a is spaced a second distance (d2) away from the diffusion pattern 41, and formed in parallel with the diffusion pattern 41. The first compensation pattern 43a is shorter than the diffusion pattern 41, and preferably has a length enough to cross the shaded area GA between the first light emitting diode LED1 and the second light emitting diode LED2. The second distance (d2) is greater than about 0.3 mm and less than about 0.7 mm.

One end 431 of the first compensation pattern 43a is disposed inward than an extension line DS1 formed by extending the inner ends of the first light emitting diode LED, and the other end 433 thereof is disposed inward than an extension line DS2 formed by extending the inner ends of the second light emitting diode LED2. Accordingly, the compensation pattern 43 is disposed provided only in the shaded area GA between the first light emitting diode LED1 and the second light emitting diode LED2, and the ends 431 and 433 are provided to face with the first light emitting diode LED1 and the second light emitting diode LED2, respectively.

The second compensation pattern 43b is formed in parallel with the first compensation pattern 43a, with spaced the second distance (d2) away from the first compensation pattern 43a. Like the first compensation pattern 43a, one end 431 and the other end 433 of the second compensation pattern 433 are disposed inward than the extension lines DS1 and DS2 and provided between the first light emitting diode LED1 and the second light emitting diode LED2, and the ends thereof respectively face the first and second light emitting diodes.

Accordingly, the light coming from the first light emitting diode LED1 is supplied to one end 4s31 of the first and second compensation patterns 43a and 43b, and the light emitted from the second light emitting diode LED2 is supplied to the other ends 433 and then to the shaded area GA along the compensation pattern 43. For this reason, light is supplied even to the shaded area GA, which is supplied with relatively little light and causes a hot spot, thereby reducing the hot spot phenomenon.

The amount of light propagated to the shaded area GA in the thus-configured light guide plate of the third exemplary embodiment is relatively large, compared to the first exemplary embodiment, because the compensation pattern comprises compensation patterns 43a and 43b in two rows. Accordingly, the third exemplary embodiment has the merit of reducing bezel size, compared to the first exemplary embodiment.

Figure 13:
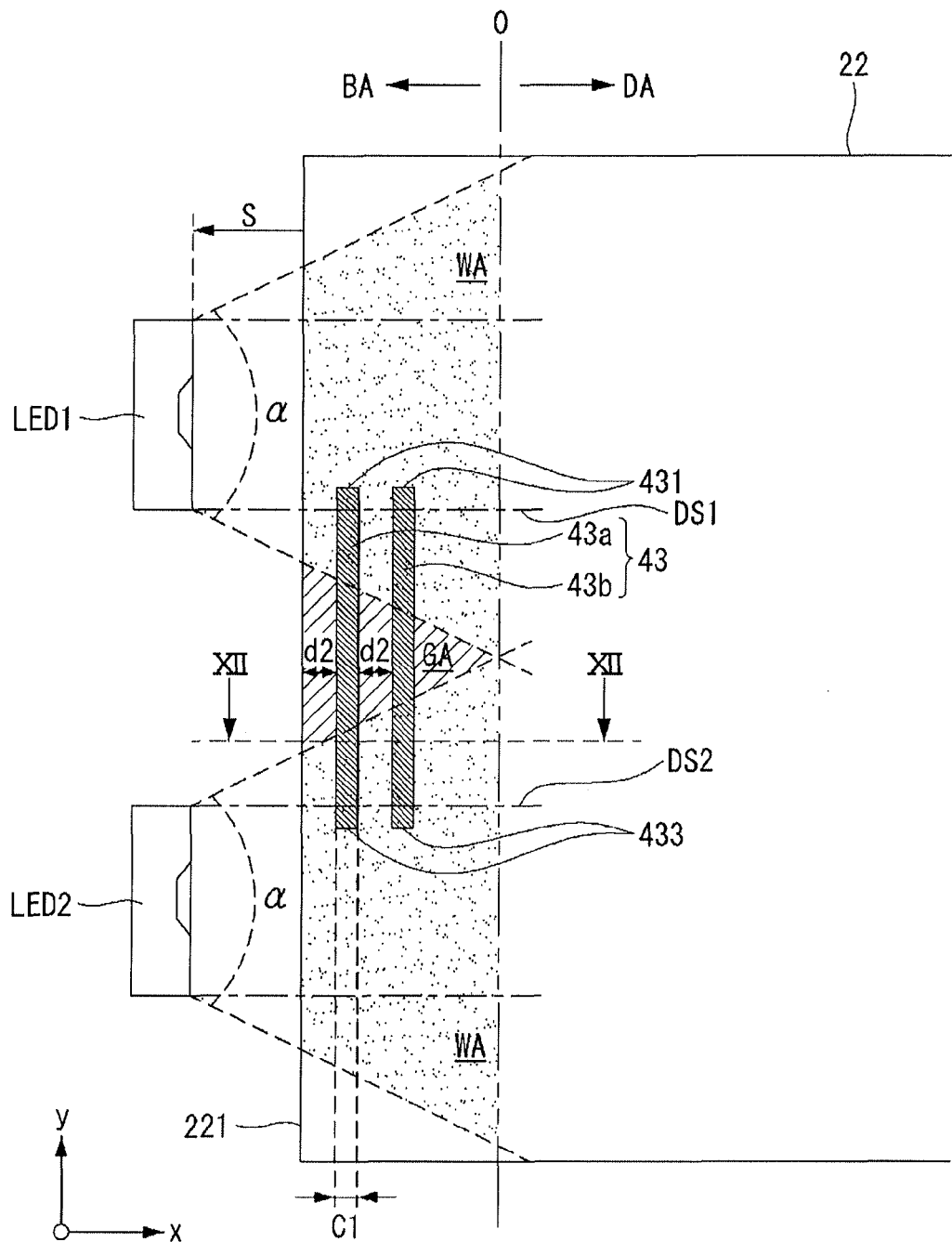
FIG. 13 is a top plan view showing the appearance of a light guide plate according to a fourth exemplary embodiment of the present invention.
Figure 14:
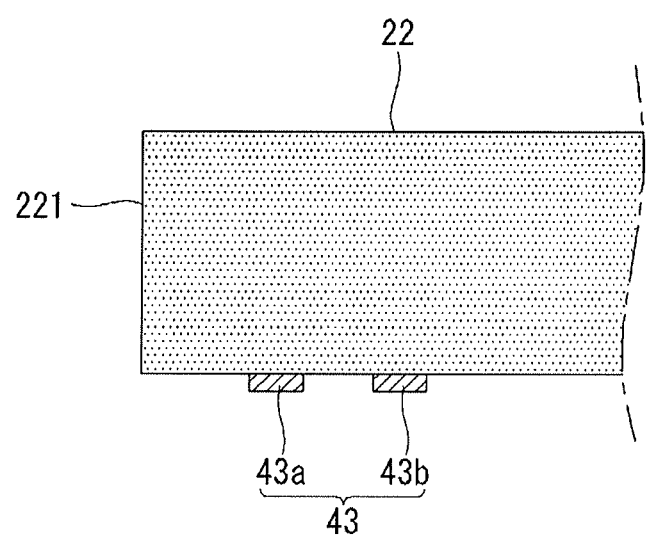
FIG. 14 is a cross-sectional view taken along line XII-XII of FIG. 13.

FIG. 13 illustrates a light guide plate according to a fourth exemplary embodiment. FIG. 14 is a cross-sectional view taken along line XII-XII of FIG. 13. The light guide plate of the fourth exemplary embodiment is different from those of the first to third exemplary embodiments in terms of manufacturing in that the pattern unit is formed by printing ink.

As generally known, the pattern unit formed of grooves, as shown in the first to third exemplary embodiments, requires a diffusion pattern 41 for uniformly transferring light to the light guide plate because it refracts light towards the liquid crystal panel, rather than diffusing the light incident on the light guide plate in the light incident direction. In the case that the pattern unit is formed by printing ink, however, this pattern unit is different from those of the first to third exemplary embodiments in that it diffuses light in the light incident direction, rather than refracting the light towards the liquid crystal panel.

In view of this, the fourth exemplary embodiment is different from the above-described exemplary embodiments in that the pattern unit 40 comprises compensation patterns alone. In FIG. 13, the pattern unit 40 according to the fourth exemplary embodiment comprises a first compensation pattern 43a and a second compensation pattern 43b adjacent to the first compensation pattern 43a.

The first compensation pattern 43a is spaced a second distance (d2) away from the incident plane 221, and is longitudinally formed in the y-axis direction in the drawing in parallel with the incident plane 221. Like the compensation patterns of the above-described exemplary embodiments, the first compensation pattern 43a is disposed to cross the shaded area GA between the first light emitting diode LED1 and the second light emitting diode LED2. Like the above-described exemplary embodiments, the second distance (d2) is greater than about 0.3 mm and less than about 0.7 mm.

One end 431 of the first compensation pattern 43a is disposed inward than an extension line DS1 formed by extending the inner ends of the first light emitting diode LED, and the other end 433 thereof is disposed inward than an extension line DS2 formed by extending the inner ends of the second light emitting diode LED2. Like above, the first compensation pattern 43a is disposed between the first light emitting diode LED1 and the second light emitting diode LED2 in the same manner as the above-described exemplary embodiments so that light is supplied to the shaded area GA which is not properly supplied with light.

The second compensation pattern 43b is formed in parallel with the first compensation pattern 43a, spaced the second distance (d2) away from the first compensation pattern 43a. Like the first compensation pattern 43a, one end 431 and the other end 433 of the second compensation pattern 433 are disposed inward than the extension lines DS1 and DS2 and provided between the first light emitting diode LED1 and the second light emitting diode LED2, and the ends thereof respectively face the first and second light emitting diodes.

Accordingly, the light emitted from the first light emitting diode LED1 is supplied to one ends 431 of the first and second compensation patterns 43a and 43b, and the light emitted from the second light emitting diode LED2 is supplied to the other ends 433 and then to the shaded area GA along the compensation pattern 43. For this reason, light is supplied even to the shaded area GA, which is supplied with relatively little light to cause a hot spot, thereby solving the hot spot phenomenon.

Since the thus-configured light guide plate of the fourth exemplary embodiment is formed by printing ink, the line width (c1) of the first and second compensation patterns 43a and 43b is greater than about 0.3 mm and less than about 0.7 mm by taking operation margin and light concentration efficiency into consideration. If the line width (c1) is greater than about 0.7 mm or less than about 0.3 mm, the brightness of light in the shaded area GA is low, thus causing a hot spot phenomenon.

While the above-described first to fourth exemplary embodiments have been described with respect to the case where both a diffusion pattern and a compensation pattern are formed in a straight line, the diffusion pattern and the compensation pattern is also formed in a zigzag line to increase the amount of light propagated along the patterns. In view of the above, it will be apparent to those skilled in the art that various changes and modifications may be made thereto without departing from the technical spirit of the invention. Accordingly, the technical scope of the invention is not limited to the above detailed description, but should be determined based on the accompanying claims.

What is claimed is:
1. A light guide plate, comprising:
an incident plane through which light emitted from a light source enters the light guide plate, the incident plane extending along a first direction;
a pattern unit defining at least one straight line groove spaced a predetermined distance away from the incident plane and at least partially extending along the first direction and parallel to the incident plane,
wherein the light guide plate comprises a bezel area blocked by a bezel and a display area outside the bezel area, wherein the pattern unit is configured to diffuse light incident through the incident plane in the first direction in the bezel area, and wherein the bezel area comprises an emission area, which falls within the range of the directivity angle of the light source, and a shaded area, which is out of the range of the directivity angle of the light source, and wherein a part of the pattern unit is formed in the shaded area, and the at least one straight line groove extends only partially into the emission area.

2. The light guide plate of claim 1, wherein the pattern unit comprises a compensation pattern which crosses the shaded area so that the ends of the compensation pattern fall within the range of the directivity angle of the light source.

3. The light guide plate of claim 2, wherein the compensation pattern is spaced away from the incident plane by a distance greater than about 0.3 mm and less than about 0.7 mm.

4. The light guide plate of claim 2, wherein the pattern unit further comprises a diffusion pattern which is disposed in both the shaded area and the emission area and is in parallel with the incident plane.

5. The light guide plate of claim 4, wherein the diffusion pattern is disposed to be more adjacent to the incident plane than the compensation pattern.

6. The light guide plate of claim 5, wherein the diffusion pattern is spaced away from the incident plane by a distance greater than about 0.8 mm and less than about 1.2 mm, and wherein the diffusion pattern is spaced away from the compensation pattern by a distance greater than about 0.3 mm and less than about 0.7 mm.

7. The light guide plate of claim 4,
wherein the line width of the compensation pattern and the diffusion pattern is greater than 8 um and less than 12 um, or greater than about 0.3 mm and less than about 0.7 mm.

8. The light guide plate of claim 1, wherein the incident plane is a flat plane.

9. A liquid crystal display apparatus comprising:
a liquid crystal display panel; and
a backlight unit comprising a light source; and
a light guide plate, comprising:
an incident plane through which light emitted from a light source enters the light guide plate, the incident plane extending along a first direction;
a pattern unit defining at least one straight line groove and spaced a predetermined distance away from the incident plane and at least partially extending along the first direction and parallel to the incident plane,
wherein the light guide plate comprises a bezel area blocked by a bezel and a display area outside the bezel area, wherein the pattern unit is configured to diffuse light incident through the incident plane in the first direction in the bezel area, and
wherein the bezel area comprises an emission area, which falls within the range of the directivity angle of the light source, and a shaded area, which is out of the range of the directivity angle of the light source, and wherein a part of the pattern unit is formed in the shaded area and the at least one straight line groove extends only partially into the emission area.

10. The liquid crystal display apparatus of claim 9, further comprising: an upper case and a lower case for packaging the liquid crystal panel and the backlight unit.

11. The liquid crystal display apparatus of claim 9, wherein the pattern unit comprises a compensation pattern which crosses the shaded area so that the ends of the pattern unit fall within the range of the directivity angle of the light source.

12. The liquid crystal display apparatus of claim 11, wherein the compensation pattern is spaced away from the incident plane by a distance greater than about 0.3 mm and less than about 0.7 mm.

13. The liquid crystal display apparatus of claim 12, wherein the diffusion pattern is disposed to be more adjacent to the incident plane than the compensation pattern.

14. The liquid crystal display apparatus of claim 13, wherein the diffusion pattern is spaced away from the incident plane by a distance greater than about 0.8 mm and less than about 1.2 mm, and wherein the diffusion pattern is spaced away from the compensation pattern by a distance greater than about 0.3 mm and less than about 0.7 mm.

15. The liquid crystal display apparatus of claim 11, wherein the pattern unit further comprises a diffusion pattern which is disposed in both the shaded area and the emission area and is in parallel with the incident plane.

16. The liquid crystal display apparatus of claim 15, wherein the line width of the compensation pattern and the diffusion pattern is greater than about 8 um and less than about 12 um, or greater than about 0.3 mm and less than about 0.7 mm.

17. A light guide plate, comprising:
an incident plane through which light emitted from a light source enters the light guide plate, the incident plane extending along a first direction;
a pattern unit defining at least one straight line groove spaced a predetermined distance away from the incident plane and at least partially extending along the first direction and parallel to the incident plane,
wherein the light guide plate comprises a bezel area blocked by a bezel and a display area outside the bezel area,
wherein the pattern unit is configured to diffuse light incident through the incident plane in the first direction in the bezel area, and wherein the bezel area comprises an emission area, which falls within the range of the directivity angle of the light source, and a shaded area, which is out of the range of the directivity angle of the light source, and
wherein a part of the pattern unit is formed in the shaded area,
wherein the pattern unit includes two straight line grooves extending along the first direction, being parallel to each other, and having different length along the first direction, and
wherein one of the two straight line grooves that is longer is disposed closer to the light source than the other one of the two straight line grooves.

* * * * *